United States Patent
Mu et al.

(10) Patent No.: US 12,530,778 B2
(45) Date of Patent: Jan. 20, 2026

(54) MODEL TRANSMISSION METHOD, MODEL TRANSMISSION APPARATUS, AND STORAGE MEDIUM

(71) Applicants: Beijing Xiaomi Mobile Software Co., Ltd., Beijing (CN); Beijing University of Posts and Telecommunications, Beijing (CN)

(72) Inventors: Qin Mu, Beijing (CN); Wei Hong, Beijing (CN); Zhongyuan Zhao, Beijing (CN); Xiaoyu Duan, Beijing (CN); Kexin Xiong, Beijing (CN)

(73) Assignees: BEIJING XIAOMI MOBILE SOFTWARE CO., LTD., Beijing (CN); BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 437 days.

(21) Appl. No.: 18/257,271

(22) PCT Filed: Dec. 21, 2020

(86) PCT No.: PCT/CN2020/138135
§ 371 (c)(1),
(2) Date: Jun. 13, 2023

(87) PCT Pub. No.: WO2022/133689
PCT Pub. Date: Jun. 30, 2022

(65) Prior Publication Data
US 2024/0029264 A1    Jan. 25, 2024

(51) Int. Cl.
*G06T 7/11*    (2017.01)

(52) U.S. Cl.
CPC .................................. *G06T 7/11* (2017.01)

(58) Field of Classification Search
None
See application file for complete search history.

(56) References Cited

U.S. PATENT DOCUMENTS

| | | | |
|---|---|---|---|
| 10,545,732 B1 | 1/2020 | Shanahin et al. | |
| 2018/0082435 A1* | 3/2018 | Whelan | G06T 7/579 |

(Continued)

FOREIGN PATENT DOCUMENTS

| | | |
|---|---|---|
| CN | 101216911 A | 7/2008 |
| CN | 103345507 A | 10/2013 |

(Continued)

OTHER PUBLICATIONS

"3rd Generation Partnership Project; Technical Specification Group Services and System Aspects; Multimedia Broadcast/Multicast Service (MBMS); Architecture and functional description (Release 16)," 3GPP TS 23.246, V16.1.0, Sep. 2019, 77 pages.

(Continued)

*Primary Examiner* — Quang N Nguyen
(74) *Attorney, Agent, or Firm* — McCoy Russell LLP

(57) ABSTRACT

A model transmission method includes: in response to receiving at least one model distribution request, determining a first model and obtaining a first quantity of model segmentation blocks by segmenting the first model, where each model distribution request in the at least one model distribution request corresponds to the model segmentation block.

14 Claims, 11 Drawing Sheets

(56) References Cited

U.S. PATENT DOCUMENTS

2020/0372694 A1    11/2020  Hwang et al.
2022/0101034 A1*    3/2022  Ekin .................... G06V 10/462
2024/0323099 A1*    9/2024  Mu ...................... H04W 24/02

FOREIGN PATENT DOCUMENTS

| CN | 105653776 A | 6/2016 |
| CN | 108961263 A | 12/2018 |
| CN | 108985255 A | 12/2018 |
| CN | 111813580 A | 10/2020 |
| JP | 2013196320 A | 9/2013 |

OTHER PUBLICATIONS

"3rd Generation Partnership Project; Technical Specification Group Radio Access Network; NR; Radio Resource Control (RRC) protocol specification (Release 16)," 3GPP TS 38.331, V.16.1.0, Jul. 2020, 906 pages.

"3rd Generation Partnership Project; Technical Specification Group Services and System Aspects; Multimedia Broadcast/Multicast Service (MBMS); Protocols and codecs (Release 16)," 3GPP TS 26.346, V.16.6.0, Sep. 2020, 285 pages.

\* cited by examiner

In response to receiving at least one model distribution request, determine a first model, and obtain a first quantity of model segmentation blocks by segmenting the first model — S11

MODEL TRANSMISSION METHOD, MODEL TRANSMISSION APPARATUS, AND STORAGE MEDIUM

CROSS REFERENCE TO RELATED APPLICATION

The present application is a U.S. National Phase of International Application No. PCT/CN2020/138135 entitled "MODEL TRANSMISSION METHOD, MODEL TRANSMISSION DEVICE, AND STORAGE MEDIUM," and filed on Dec. 21, 2020. The entire contents of the above-listed application are hereby incorporated by reference for all purposes.

BACKGROUND

Communication networks have the characteristics of ultra-high speed, ultra-low latency, ultra-high reliability, and ultra-multiple connections to meet the needs of multi-service scenarios, and the service scenarios, as well as the corresponding needs and the characteristics of the communication networks bring unprecedented challenges to deployment, operation and maintenance for the communication networks.

SUMMARY

According to a first aspect of the examples of the present disclosure, a model transmission method is provided, and performed by a network device, and the method includes:
in response to receiving at least one model distribution request, determining a first model, and obtaining a first quantity of model segmentation blocks by segmenting the first model; where each model distribution request in the at least one model distribution request corresponds to the model segmentation blocks.

According to a second aspect of the examples of the present disclosure, a model transmission method is provided, and performed by a terminal, and the method includes:
sending a model distribution request; where the model distribution request corresponds to model segmentation blocks.

According to a third aspect of the examples of the present disclosure, a model transmission apparatus is provided, and includes:
a processor; and a memory configured to store instructions capable of being executed by the processor; where the processor is configured to: execute the model transmission method in the first aspect or in any one example in the first aspect, or execute the model transmission method in the second aspect or in any one example in the second aspect.

According to a fourth aspect of the examples of the present disclosure, a non-transitory computer-readable storage medium is provided, and when instructions in the storage medium are executed by a processor of a mobile terminal, the mobile terminal is enabled to execute the model transmission method in the first aspect or in any one example in the first aspect, or the mobile terminal is enabled to execute the model transmission method in the second aspect or in any one example in the second aspect.

BRIEF DESCRIPTION OF THE DRAWINGS

The drawings here are incorporated into the specification and constitute a part of the specification, show the examples that comply with the present disclosure, and are used together with the specification for explaining the principles of the present disclosure.

DETAILED DESCRIPTION

Figures 1, 2:
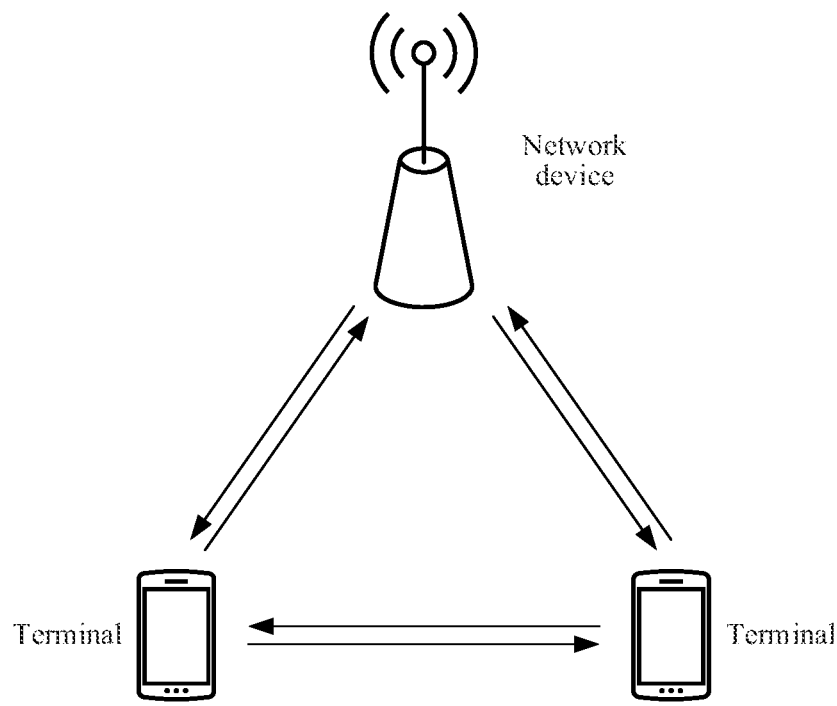
FIG. 1 is a schematic diagram of a system architecture of a model transmission method provided by the present disclosure.
FIG. 2 is a flowchart of a model transmission method shown according to an exemplary example.

The exemplary examples will be described in detail here, and instances thereof are shown in the drawings. When the following description refers to the drawings, unless otherwise indicated, the same numbers in the different drawings represent the same or similar elements. The implementations described in the following exemplary examples do not represent all the implementations consistent with the present disclosure. Instead, the implementations are merely instances of apparatuses and methods consistent with some aspects of the present disclosure, which are described in detail in the accompanying claims.

The present disclosure relates to the technical field of wireless communications, and in particular to a model transmission method, a model transmission apparatus, and a storage medium.

Communication networks have the characteristics of ultra-high speed, ultra-low latency, ultra-high reliability, and ultra-multiple connections to meet the needs of multi-service scenarios, and the service scenarios, as well as the corresponding needs and the characteristics of the communication networks bring unprecedented challenges to deployment, operation and maintenance for the communication networks.

In the related art, artificial intelligence is introduced to increase the resource utilization rate of the communication networks, and improve terminal service experience, and automatic and intelligent control and management for the communication networks. A model obtained through deep learning of artificial intelligence may have better performance. However, when the model is sent to a terminal, if the whole model is sent to the terminal, not only is the amount of data transmitted relatively large, but also for the terminal, the computing power is difficult to meet the needs of model reasoning and training.

With the breakthroughs in artificial intelligence technologies, especially in the aspects of the enrichment of deep learning algorithms, the improvement of hardware computing power, the introduction of massive data in the new-generation communication network, etc., strong support is provided for the intelligence of the new-generation network. Moreover, by virtue of artificial intelligence, the resource utilization rate of the communication networks is further increased, terminal service experience of the communication networks is improved, and automatic and intelligent control and management for the communication networks are realized.

In the related art, the performance of deep learning in handling many tasks reaches unprecedented heights. A plurality of models are obtained according to deep learning, and better performance may be obtained. A terminal obtains a needed model by sending a model distribution request to a network side. Generally, the following method may be adopted for a process of applying for a model from the network side by the terminal:

the terminal initiates a model distribution request to the network side (such as a base station), the base station sends a configuration measurement request to a user, and the terminal measures a configuration according to radio resource control (RRC), determines a measurement result (such as channel quality), and sends the determined measurement result to the base station. The base station determines to carry out transmission resource allocation according to the channel measurement result, and sends the model to the terminal in a manner of unicasting transmission and according to a transmission resource allocation result. The terminal executes model reception according to allocated resources, and determines a model.

According to the process of applying for a model from the network side by the terminal in the above example, it may be determined that there are the following shortcomings in the related art:

(1) the base station does not carry out a reasonable model selection, so that the model distributed to the terminal may not achieve relatively high model precision and model complexity in all the terminals, and meanwhile, the problem of a too high transmission load may also be generated, so that the situation of a shortage of wireless resources is caused.

(2) The base station directly distributes the models to all the terminals, so that the amount of data used for transmitting the models between the base station and terminals is large, the problem of a too high transmission load is also generated, and then communication overheads are increased.

(3) After the terminal determines the model, the model needs to be reasoned and trained, and if the terminal obtains the whole model, high requirements are placed on the computing power of the terminal during reasoning and training, therefore, the computing power of a part of the terminals cannot meet the requirements of model reasoning and training.

Based on the above shortcomings, the present disclosure provides a model transmission method. Through selecting the model needed by the terminal, segmenting the model, and distributing the segmented model segmentation blocks to the terminal, unnecessary communication overheads may be reduced, the resource utilization rate of the wireless networks may be increased, and the requirements of the terminal on the model reasoning and training may be reduced, so that the problems that the deep learning model has a too large data amount and the computing power of the terminal is difficult to meet the computing needs, are solved.

FIG. 1 is a schematic diagram of a system architecture of a model transmission method provided by the present disclosure. As shown in FIG. 1, the system includes a core network part and a wireless access network part. A terminal (user) is accessed into a base station through a wireless channel, the base stations are connected through an interface Xn, the base station is accessed into a user port function (UPF) network element of a core network through an interface N3, the UPF network element is accessed into a session management function (SMF) network element through an interface N4, and the SMF network element is accessed into a bus structure of the core network, and connected with other network functions (NFs) of the core network.

It may be understood that, a communication system between a network device and the terminal shown in FIG. 1 is merely used for schematic description, and the wireless communication system may further include other network devices, such as a wireless relay device and a wireless return device, which are not shown in FIG. 1. In the examples of the present disclosure, the quantity of the network devices and the quantity of the terminals included in the wireless communication system are not limited.

It may further be understood that, the wireless communication system in the examples of the present disclosure is a network that provides a wireless communication function. The wireless communication system may adopt different communication technologies, such as code division multiple access (CDMA), wideband code division multiple access (WCDMA), time division multiple access (TDMA), frequency division multiple access (PUMA), orthogonal frequency-division multiple access (OFDMA), single carrier FDMA (SC-FDMA), and carrier sense multiple access with collision avoidance. According to factors such as capacities, speeds, and latencies of different networks, the networks may be divided into 2G (generation) networks, 3G networks, 4G networks, or future evolution networks such as 5G networks, and the 5G networks may also be referred to as new radios (NRs). For the convenience of description, the wireless communication networks are sometimes referred to as networks for short in the present disclosure.

Further, the network device involved in the present disclosure may also be referred to as a wireless access network device. The wireless access network device may be: a base station, an evolved node B (base station), a home base station, an access point (AP) in a wireless fidelity (WIFI) system, a wireless relay node, a wireless return node, a transmission point (TP) or a transmission and reception point (TRP), etc., and the wireless access network device may also be gNB in an NR system, or may be a component or a part of device that constitutes the base station. For a vehicle-to-everything (V2X) communication system, the network device may also be an on-board device. It needs to be understood that, in the examples of the present disclosure, a specific technology and a specific device form which are adopted by the network device are not limited.

Further, the terminal involved in the present disclosure may also be referred to as a terminal device, a user equipment (UE), a mobile station (MS), a mobile terminal (MT), etc., and is a device that provides voice and/or data connectivity to a user, for example, the terminal may be a hand-held device, an on-board device and so on with a wireless connection function. At present, some instances of the terminal are: a mobile phone, a pocket personal computer (PPC), a palm computer, a personal digital assistant (PDA), a notebook computer, a tablet computer, a wearable device, or an on-board device. In addition, for a vehicle-to-everything (V2X) communication system, the terminal device may also be an on-board device. It needs to be understood that, in the examples of the present disclosure, a specific technology and a specific device form which are adopted by the terminal are not limited.

FIG. 2 is a flowchart of a model transmission method shown according to an exemplary example. As shown in FIG. 2, the model transmission method is used in a network device, and includes the following steps.

In step S11, in response to receiving at least one model distribution request, a first model is determined, and the first model is segmented to obtain a first quantity of model segmentation blocks.

In the examples of the present disclosure, each model distribution request in the at least one model distribution request corresponds to the model segmentation blocks.

In the examples of the present disclosure, the network device (such as a base station) receives at least one model distribution request initiated by a terminal. The model distribution request may further include information on model precision, generalization performance and so on of the distributed model.

The base station determines to send RRC reconfiguration to the terminal according to the received model distribution request. The RRC reconfiguration is sent to obtain information on configuration measurement, mobility control, wireless resource configuration, etc. A measurement result sent by the terminal is received through a measurement report message.

According to the at least one model distribution request received, the base station carries out joint model selection in a plurality of local models for all the model distribution requests received to determine first models which are used for being distributed to the terminals. The first model is segmented, a first quantity of model segmentation blocks is determined, and the model segmentation blocks are sent to the corresponding terminal based on the received model distribution request.

In the examples of the present disclosure, the first model for each terminal is determined through the joint model selection for the model distribution requests, the first model is segmented, and the model segmentation blocks are sent to the corresponding terminal, so that the model segmentation blocks needed by each terminal may be flexibly adapted, and the problem that the computing power of the terminal is difficult to meet the needs of model reasoning and training, may also be solved.

The model transmission method provided by the present disclosure includes in response to receiving at least one model request, determining a first model.

Figure 3:
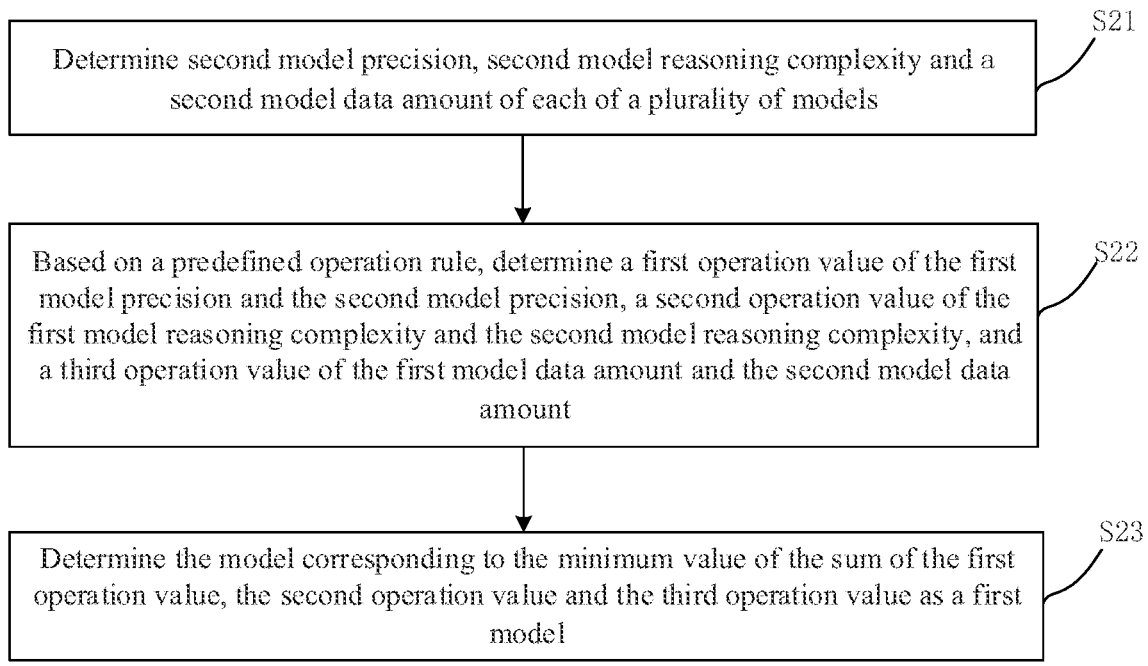
FIG. 3 is a flowchart of another model transmission method shown according to an exemplary example.

FIG. 3 is a flowchart of a model transmission method shown according to an exemplary example. As shown in FIG. 3, the in response to receiving at least one model request, determining a first model includes the following steps.

In step S21, second model precision, second model reasoning complexity and a second model data amount of each of a plurality of models are determined.

In the examples of the present disclosure, the model distribution request received by the base station may further include the needs of the terminal on model precision, model reasoning complexity, and a model data amount, in the present disclosure, for the convenience of differentiation, the needs of the terminal on the model precision, the model reasoning complexity, and the model data amount are referred to as first model precision, first model reasoning complexity, and a first model data amount. The base station determines the respective model precision, model reasoning complexity, and model data amount of each model based on the local models. Similarly, in the present disclosure, for the convenience of differentiation, the respective corresponding model precision, model reasoning complexity, and model data amount of each model included in the base station are referred to as second model precision, second model reasoning complexity, and a second model data amount.

In step S22, based on a predefined operation rule, a first operation value of the first model precision and the second model precision, a second operation value of the first model reasoning complexity and the second model reasoning complexity, and a third operation value of the first model data amount and the second model data amount are determined.

In the examples of the present disclosure, the predefined operation rule may be determined through the following formula:

$$(x, y) = \begin{cases} 0, & \text{if } x \geq y \\ |x - y|^2, & \text{if } x < y \end{cases}$$

where x represents an unknown number, and y represents an unknown number.

For example, the first model precision and the second model precision are put into the above formula to determine the first operation value, and at this moment, x may be the second model precision, and y may be the first model precision. The second operation value may be determined by putting the first model reasoning complexity and the second model reasoning complexity into the above formula, and at this moment, x may be the second model reasoning complexity, and y may be the first model reasoning complexity. The third operation value may be determined by putting the first model data amount and the second model data amount into the above formula, and at this moment, x may be the second model data amount, and y may be the first model data amount.

In step S23, the model corresponding to the minimum value of the sum of the first operation value, the second operation value and the third operation value is determined as a first model.

In the examples of the present disclosure, the minimum value of the sum of the first operation value, the second operation value and the third operation value may be determined through the following formula:

$$m = \underset{m}{\operatorname{argmin}} \sum_{u=1}^{U} \{(a^m, a_u) + (b_u, b^m) + (c_u, c^m)\}$$

Where $a_u$ is the first model precision, $b_u$ is the first model reasoning complexity, $c_u$ is the first model data amount, and m is the first model; and a m is the second model precision, $b^m$ is the second model reasoning complexity, and cm is the second model data amount. U is the quantity of the model distribution requests.

In the examples of the present disclosure, the predefined operation rule is determined in the following manner:

in response to that the second model precision is greater than or equal to the first model precision, determining that the first operation value is zero as the operation rule; or, in response to that the second model precision is less than the first model precision, determining that the first operation value is the square of the difference between the first model precision and the second model precision as the operation rule; or, in response to that the first model reasoning complexity is greater than or equal to the second model reasoning complexity, determining that the second operation value is zero as the operation rule; or, in response to that the first model reasoning complexity is less than the second model reasoning complexity, determining that the second operation value is the square of the difference between the first model reasoning complexity and the second model reasoning complexity as the operation rule; or, in response to that the first model data amount is greater than or equal to the second model data amount, determining that the third operation value is zero as the operation rule; or, in response to that the first model data amount is less than the second model data amount, determining that the third operation value is the square of the difference between the first model data amount and the second model data amount as the operation rule.

In the examples of the present disclosure, the base station determines computing power resources and communication resources of the terminal included in the received model distribution request. First model data amounts of the first models are determined, and a plurality of model segmentation point options are determined based on the computing power resources and the communication resources which need to be consumed by the models in each layer in the first models, and the model characteristics such as the first model data amounts. The model segmentation point options are configured to segment the first model.

In the examples of the present disclosure, the base station may send a first indication message which is configured to indicate the plurality of model segmentation point options determined.

In the examples of the present disclosure, the model distribution request received by the base station may further include first model segmentation point options. The base station determines to segment the first model according to the at least one first model segmentation point option received, and segments the first model into different model segmentation blocks, that is, obtains a first quantity of model segmentation blocks. For the first quantity of model segmentation blocks, the base station may further combine the model segmentation blocks that meet combination conditions to obtain a second quantity of model segmentation blocks, where it may be understood that, the first quantity and the second quantity may be the same, or the second quantity is less than the first quantity.

In the examples of the present disclosure, the base station may combine the first quantity of model segmentation blocks according to the combination conditions to obtain a second quantity of model segmentation blocks in the following implementation.

Figure 4:
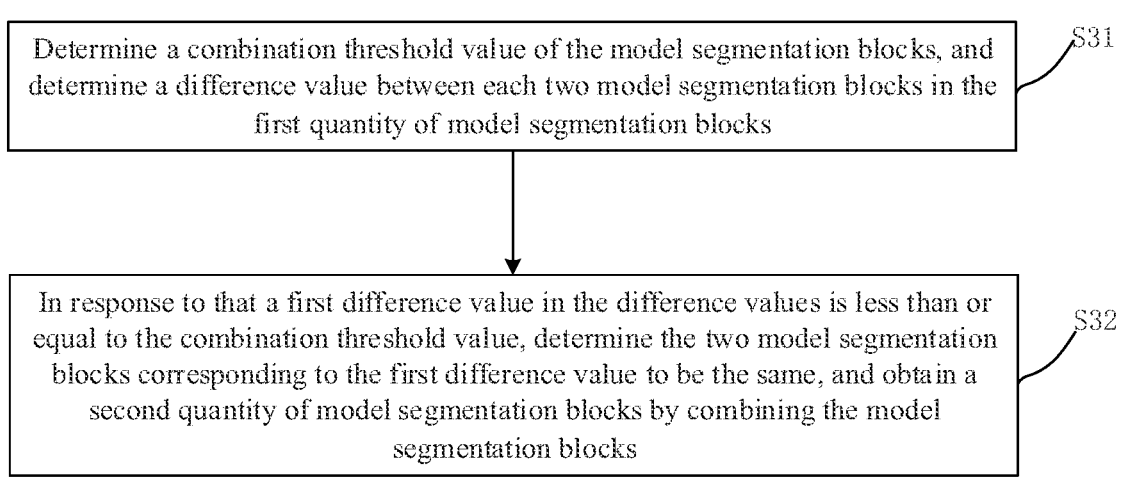
FIG. 4 is a flowchart of another model transmission method shown according to an exemplary example.

FIG. 4 is a flowchart of a model transmission method shown according to an exemplary example. As shown in FIG. 4, the model transmission method is used in a network device, and further includes the following steps.

In step S31, a combination threshold value of the model segmentation blocks is determined, and a difference value between each two model segmentation blocks in the first quantity of model segmentation blocks is determined.

In step S32, in response to that a first difference value in the difference values is less than or equal to the combination threshold value, the two model segmentation blocks corresponding to the first difference value are determined to be the same, and the model segmentation blocks are combined to obtain a second quantity of model segmentation blocks.

In the examples of the present disclosure, the base station compares all the difference values determined with the combination threshold value. An average value of the two model segmentation blocks corresponding to the first difference value which is less than or equal to the combination threshold value may be determined, and the two model segmentation blocks are combined according to the average value. In the examples of the present disclosure, the model segmentation blocks may be combined to obtain a second quantity of model segmentation blocks by adopting the following formula:

$$P = \frac{1}{M} \sum_{m=1}^{M} P^m$$

where m=1, . . . , M represents indexes of the different model segmentation blocks, $P^m$ represents a parameter matrix of the mth model segmentation block, and P represents a parameter matrix of the combined model segmentation blocks.

The second quantity of model segmentation blocks is obtained by obtaining the parameter matrix of the combined model segmentation blocks.

In the examples of the present disclosure, the model transmission method further includes determining a combination threshold value of the model segmentation blocks.

Figure 5:
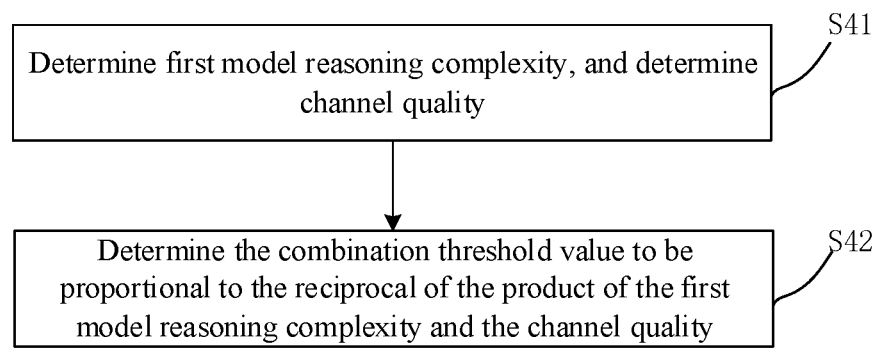
FIG. 5 is a flowchart of another model transmission method shown according to an exemplary example.

FIG. 5 is a flowchart of a model transmission method shown according to an exemplary example. As shown in FIG. 5, the determining a combination threshold value of the model segmentation blocks includes the following steps.

In step S41, first model reasoning complexity is determined, and channel quality is determined.

In step S42, the combination threshold value is determined to be proportional to the reciprocal of the product of the first model reasoning complexity and the channel quality.

In the examples of the present disclosure, the step that the base station determines first model reasoning complexity and channel quality, and determines the combination threshold value to be proportional to the reciprocal of the product of the first model reasoning complexity and the channel quality may be expressed through the following formula:

$$\varepsilon \propto \frac{1}{a \cdot d}$$

where a is the first model reasoning complexity, d is the value of the channel quality, and ε represents the combination threshold value that judges whether to carry out combination operation for the model segmentation blocks.

Figure 6:
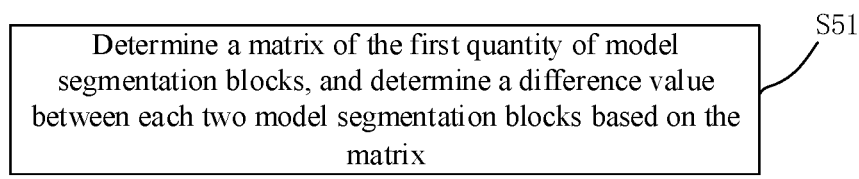
FIG. 6 is a flowchart of another model transmission method shown according to an exemplary example.

FIG. 6 is a flowchart of a model transmission method shown according to an exemplary example. As shown in FIG. 6, the determining a difference value between each two model segmentation blocks in the first quantity of model segmentation blocks includes the following steps.

In step S51, a matrix of the first quantity of model segmentation blocks is determined, and a difference value between each two model segmentation blocks is determined based on the matrix.

In the examples of the present disclosure, the base station may determine a matrix of the first quantity of model segmentation blocks, such as a parameter matrix of the model segmentation blocks. A difference value between the model segmentation blocks is determined through the parameter matrix of the model segmentation blocks, and each difference value is compared with the combination threshold value. The following formula may be adopted for the manner $$\sum_{i=1}^{I}\sum_{j=1}^{J}|P_{ij}^m - P_{ij}^n|^2 \begin{cases} \leq \varepsilon, \text{ then } m = n \\ > \varepsilon, \text{ then } m \neq n \end{cases}$$

where $P \in \mathbb{R}^{I \times J}$ is the parameter matrix of the model segmentation blocks, m is the mth model segmentation block, n is the nth model segmentation block, ε is the combination threshold value that judges whether to carry out combination operation for the model segmentation blocks, I is the quantity of rows in the parameter matrix, J is the quantity of columns in the parameter matrix, i is the ith row of the parameter matrix, and j is the jth row of the parameter matrix.

In some examples of the present disclosure, according to the above formula, the base station, in response to that the first difference value in the difference values is less than or equal to the combination threshold value, determines the mth model segmentation block and the nth model segmentation block corresponding to the first difference value to be the same. In response to that the first difference value in the difference values is greater than the combination threshold value, the mth model segmentation block and the nth model segmentation block are determined to be different.

In the examples of the present disclosure, the base station determines a second quantity of model segmentation blocks, and sends a second indication message. The second indication message includes at least one model segmentation block in the second quantity of model segmentation blocks.

In the examples of the present disclosure, the base station determines a model distribution request corresponding to each model segmentation block, and determines a sending manner for sending the second indication message. The sending manner for sending the second indication message by the base station includes a unicasting manner, a multicasting manner, and a broadcasting manner.

In an example of the present disclosure, in response to that the first model segmentation blocks in the second quantity of model segmentation blocks correspond to one model distribution request, a second indication message is determined to be sent based on unicasting. The base station singly sends the second indication message to the terminal corresponding to the first model segmentation blocks.

In an example of the present disclosure, in response to that the first model segmentation blocks in the second quantity of model segmentation blocks correspond to a plurality of the model distribution requests, a second indication message is determined to be sent based on multicasting. The base station requests multicasting transmission for the model segmentation blocks from a multimedia broadcast/multicast service (MBMS) GW; the MBMS GW sends an MBMS authorization request to a BM-SC, seeks an authorization for the terminal to receive data, and requests MBMS context activation from a user; and the terminal sends an MBMS context activation request to the MBMS GW, and then the MBMS GW sends an MBMS registration request to the BM-SC to obtain MBMS bearing information of MBMS bearing service, for verifying whether MBMS bearing capacity of the terminal meets the needed MBMS bearing capacity or not.

In an example of the present disclosure, in response to that the first model segmentation blocks in the second quantity of model segmentation blocks correspond to all the model distribution requests, a second indication message is determined to be sent based on broadcasting. The base station requests broadcasting transmission for the model segmentation blocks from the MBMS GW; and the MBMS GW sends an MBMS authorization request to the BM-SC, seeks an authorization for the terminal to receive data, and verifies whether MBMS bearing capacity of the terminal meets the needed MBMS bearing capacity or not.

Figure 7:
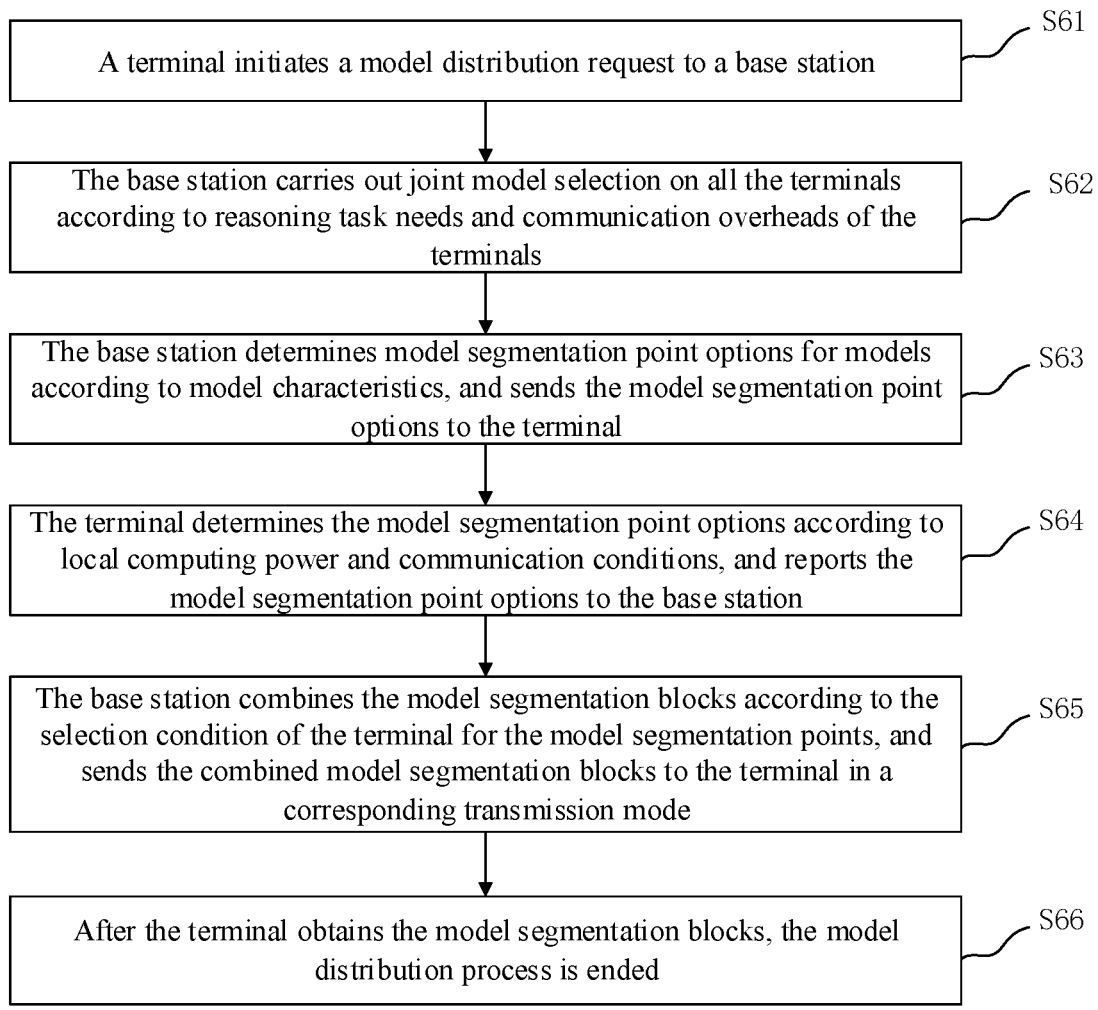
FIG. 7 is a schematic diagram of a model transmission method shown according to an exemplary example.

FIG. 7 is a schematic diagram of a model transmission method shown according to an exemplary example; As shown in FIG. 7, this method includes the following steps:

step S61, a terminal initiates a model distribution request to a base station.

Step S62, the base station carries out joint model selection on all the terminals according to reasoning task needs and communication overheads of the terminals.

Step S63, the base station determines model segmentation point options for models according to model characteristics, and sends the model segmentation point options to the terminal.

Step S64, the terminal determines the model segmentation point options according to local computing power and communication conditions, and reports the model segmentation point options to the base station.

Step S65, the base station combines the model segmentation blocks according to the selection condition of the terminal for the model segmentation points, and sends the combined model segmentation blocks to the terminal in a corresponding transmission mode.

Step S66, after the terminal obtains the model segmentation blocks, the model distribution process is ended.

Based on the same/similar concept, the examples of the present disclosure further provide a model transmission method.

Figure 8:
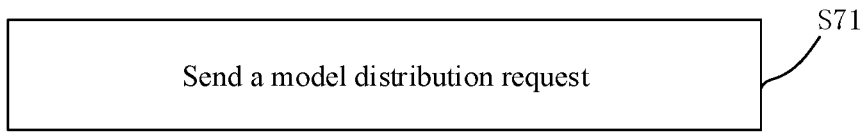
FIG. 8 is a flowchart of another model transmission method shown according to an exemplary example.

FIG. 8 is a flowchart of a model transmission method shown according to an exemplary example. As shown in FIG. 8, the model transmission method is performed by a terminal, and includes the following steps.

In step S71, a model distribution request is sent.

In the examples of the present disclosure, the model distribution request corresponds to model segmentation blocks. The terminal may request a corresponding model distribution request from a network device according to own needs. The model distribution request further includes model needs on reasoning tasks and communication overheads, and may include needs on model precision, model reasoning complexity, and a model data amount.

Figure 9:
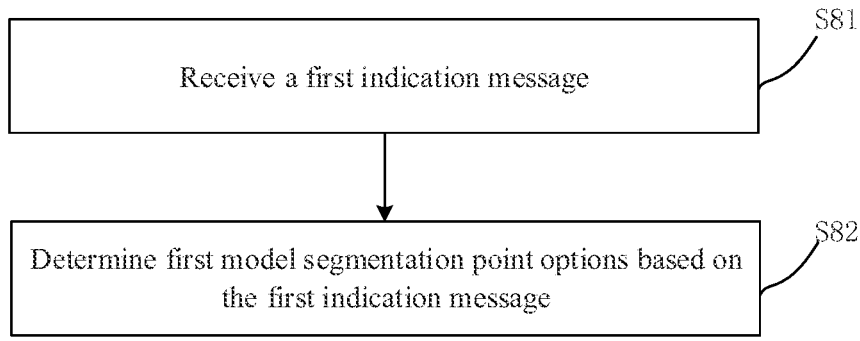
FIG. 9 is a flowchart of another model transmission method shown according to an exemplary example.

FIG. 9 is a flowchart of a model transmission method shown according to an exemplary example. As shown in FIG. 9, the model transmission method is performed by a terminal, and includes the following steps.

In step S81, a first indication message is received.

In the examples of the present disclosure, the first indication message includes a plurality of model segmentation point options, where the model segmentation point options are configured to segment a model.

In step S82, first model segmentation point options are determined based on the first indication message.

In the examples of the present disclosure, the terminal selects the received model segmentation point options according to own needs and capabilities (such as computing power, and model reasoning and training capabilities).

Figure 10:
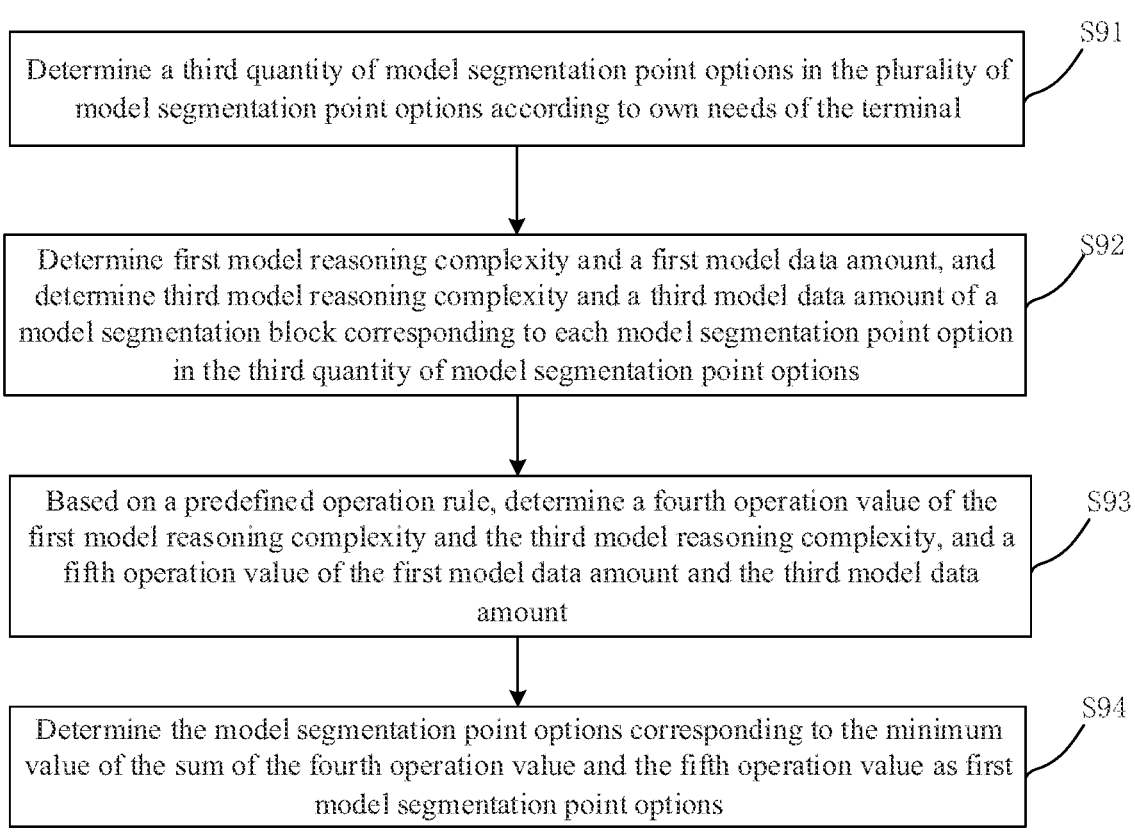
FIG. 10 is a flowchart of another model transmission method shown according to an exemplary example.

FIG. 10 is a flowchart of a model transmission method shown according to an exemplary example. As shown in FIG. 10, the determining first model segmentation point options based on the first indication message includes the following steps.

In step S91, a third quantity of model segmentation point options in the plurality of model segmentation point options is determined according to own needs of the terminal.

In step S92, first model reasoning complexity and a first model data amount are determined, and third model reasoning complexity and a third model data amount of a model segmentation block corresponding to each model segmentation point option of the third quantity of model segmentation point options are determined.

In step S93, based on a predefined operation rule, a fourth operation value of the first model reasoning complexity and the third model reasoning complexity, and a fifth operation value of the first model data amount and the third model data amount are determined.

In step S94, the model segmentation point options corresponding to the minimum value of the sum of the fourth operation value and the fifth operation value are determined as first model segmentation point options.

In the examples of the present disclosure, the terminal determines a third quantity of model segmentation point options in the plurality of model segmentation point options according to the plurality of model segmentation point options received, and the own needs and capabilities of the terminal. For example, the third quantity of model segmentation point options is N model segmentation point options, the nth model segmentation point option is taken as an example, the terminal determines own first model reasoning complexity and first model data amount, and determines third model reasoning complexity and a third model data amount of the corresponding model segmentation block of the nth model segmentation point option.

In some examples of the present disclosure, according to a predefined operation rule, the terminal determines a fourth operation value of the first model reasoning complexity and the third model reasoning complexity, and a fifth operation value of the first model data amount and the third model data amount. The predefined operation rule may be determined by adopting the following formula.

$$(x, y) = \begin{cases} 0, & \text{if } x \geq y \\ |x - y|^2, & \text{if } x < y \end{cases}$$

Where x represents an unknown number, and y represents an unknown number.

For example, the fourth operation value may be determined by putting the first model reasoning complexity and the third model reasoning complexity into the above formula, and at this moment, x may be the first model reasoning complexity, and y may be the third model reasoning complexity. The fifth operation value may be determined by putting the first model data amount and the third model data amount into the above formula, and at this moment, x may be the first model data amount, and y may be the third model data amount.

In the examples of the present disclosure, the terminal determines the model segmentation point options corresponding to the minimum value of the sum according to the fourth operation value and the fifth operation value determined, and determines the model segmentation point options as first model segmentation point options. The first model segmentation point options may further be determined through the following formula:

$$n = \underset{n}{\operatorname{argmin}}[(a, a^n) + (b, b^n)]$$

where n is the nth model segmentation point option, a is the first model reasoning complexity, b is the first model data amount, an is the third model reasoning complexity of the model segmentation block corresponding to the nth model segmentation point option, and Lon is the third model data amount of the model segmentation block corresponding to the nth model segmentation point option.

In some examples of the present disclosure, the predefined operation rule may be determined in the following manner:

in response to that the first model reasoning complexity is greater than or equal to the third model reasoning complexity, determining that the fourth operation value is zero as the operation rule; or, in response to that the first model reasoning complexity is less than the third model reasoning complexity, determining that the fourth operation value is the square of the difference between the first model reasoning complexity and the third model reasoning complexity as the operation rule; or, in response to that the first model data amount is greater than or equal to the third model data amount, determining that the fifth operation value is zero as the operation rule; or, in response to that the first model data amount is less than the third model data amount, determining that the fifth operation value is the square of the difference between the first model data amount and the third model data amount as the operation rule.

Figure 11:
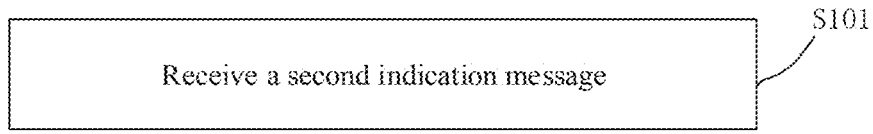
FIG. 11 is a flowchart of another model transmission method shown according to an exemplary example.

FIG. 11 is a flowchart of a model transmission method shown according to an exemplary example. As shown in FIG. 11, the model transmission method is performed by a terminal, and further includes the following steps.

In step S101, a second indication message is received.

In the examples of the present disclosure, the second indication message includes at least one model segmentation block in the second quantity of model segmentation blocks.

Figure 12:
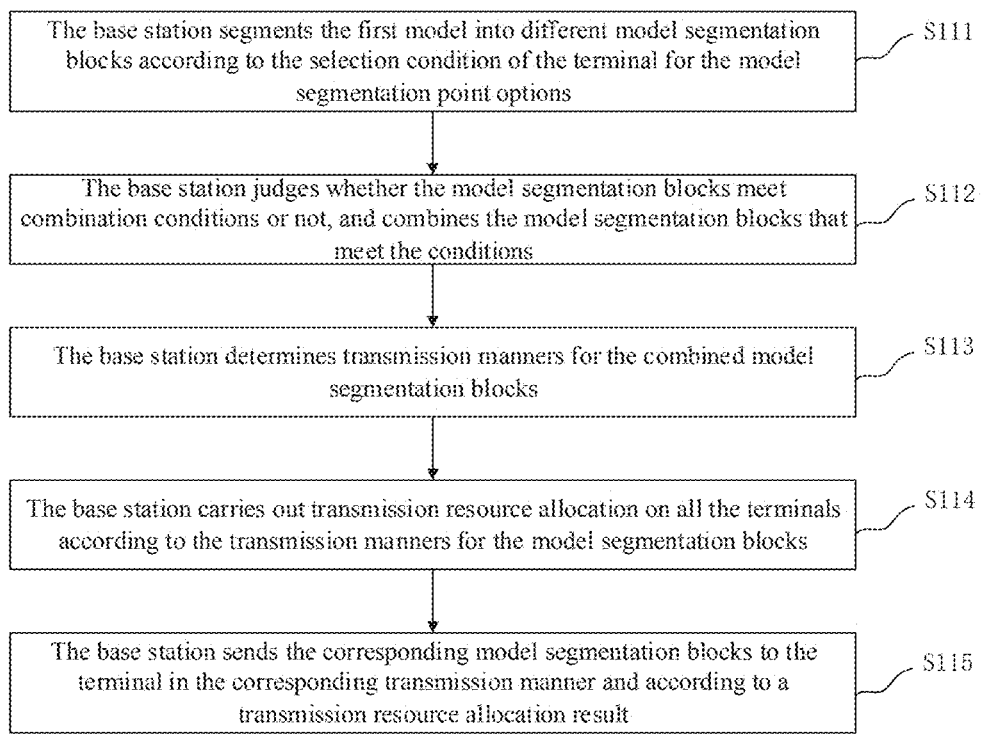
FIG. 12 is a schematic diagram of a model transmission method shown according to an exemplary example.

FIG. 12 is a schematic diagram of a model transmission method shown according to an exemplary example; As shown in FIG. 12, this method includes the following steps:

In step S111, the base station segments the first model into different model segmentation blocks according to the selection condition of the terminal for the model segmentation point options.

In step S112, the base station judges whether the model segmentation blocks meet combination conditions or not, and combines the model segmentation blocks that meet the conditions.

In step S113, the base station determines transmission manners for the combined model segmentation blocks.

In step S114, the base station carries out transmission resource allocation on all the terminals according to the transmission manners for the model segmentation blocks.

In step S115, the base station sends the corresponding model segmentation blocks to the terminal in the corresponding transmission manner and according to a transmission resource allocation result.

Figure 13:
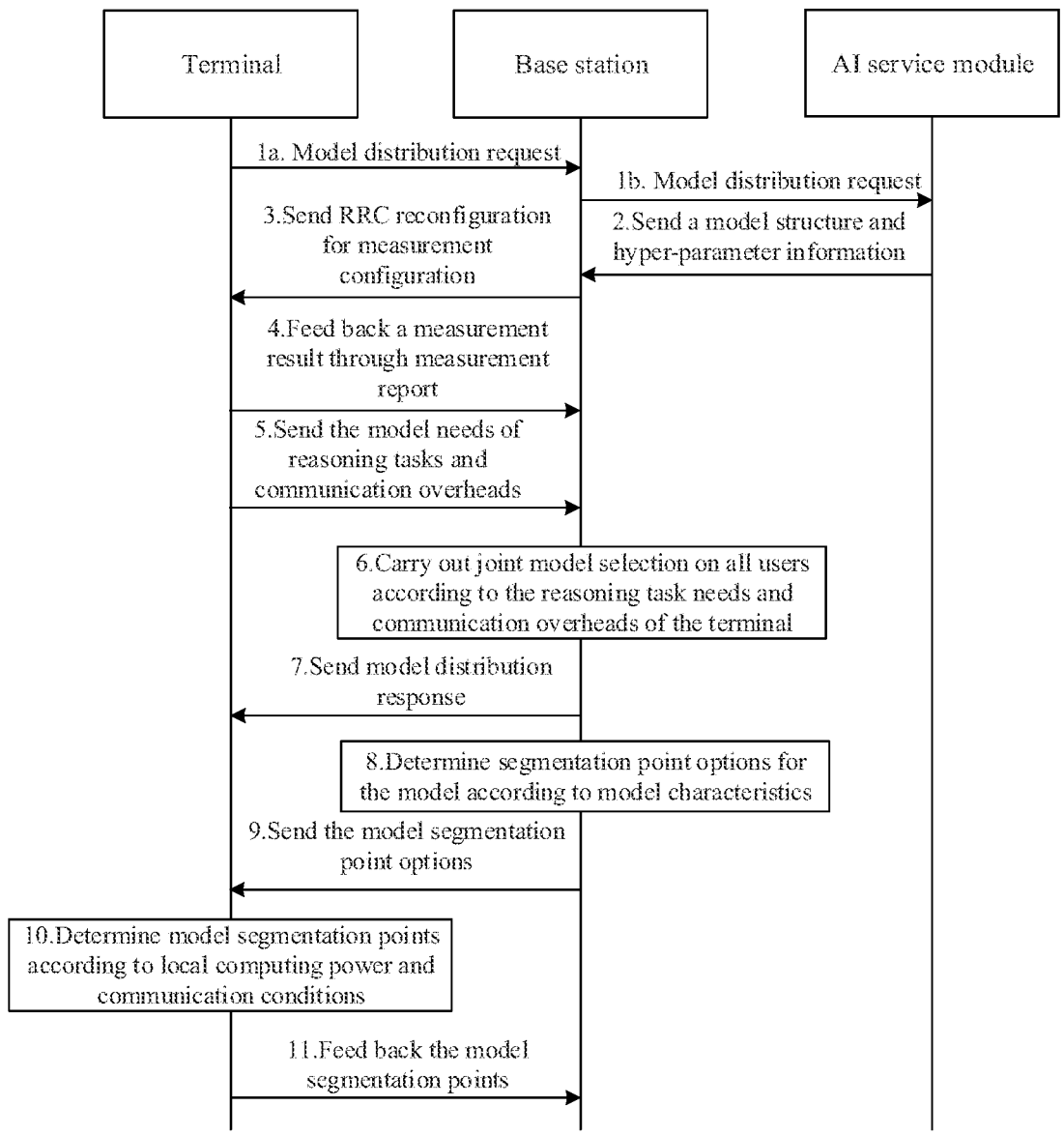
FIG. 13 is a principle diagram of protocols and interfaces of model selection and model segmentation parts in a model transmission method shown according to an exemplary example.

FIG. 13 is a principle diagram of protocols and interfaces of model selection and model segmentation parts in a model transmission method shown according to an exemplary example. As shown in FIG. 13, it mainly relates to a terminal, a base station, and an AI service module in the model transmission method provided by the examples of the present disclosure. The AI service module here is actually included in the base station, and responsible for providing deep learning models and related parameters; and the base station is responsible for data transmission and control signaling interaction with the terminal, as well as selection, segmentation and resource allocation for the first model, and the implementation is as follows:

the terminal sends a model distribution request signaling to the base station, and the signaling indicates a content of: initiating a model distribution request to the base station. The base station sends the model distribution request signaling to the AI service module. The AI service module sends a signaling of sending a model structure and hyper-parameter information to the base station, and the signaling indicates a content of: sending the model structure and hyper-parameter information to a receiving side. The base station sends a signaling of sending RRC reconfiguration for configuration measurement to the terminal, and the signaling indicates a content of: sending the RRC reconfiguration for configuration measurement to the terminal. The terminal measures configuration according to RRC, and sends a signaling of feeding back a measurement result through measurement report to the base station, and the signaling indicates a content of: sending the measurement report measurement result to the base station. The terminal sends a signaling of sending the model needs of reasoning tasks and communication overheads to the base station, and the signaling indicates a content of: sending the model needs of reasoning tasks and communication overheads to the receiving side. The base station carries out joint model selection on all the terminals in an existing model space according to the reasoning task needs and the communication overheads of the terminal. The base station sends a model distribution response signaling to the terminal, and the signaling indicates a content of: sending model distribution response to the terminal. The base station determines model segmentation point options for the model according to model characteristics. The base station sends a signaling of sending model segmentation point options to the terminal, and the signaling indicates a content of: sending the model segmentation point options to the receiving side. The terminal determines model segmentation points according to local computing power and communication conditions. The terminal sends a signaling of sending model segmentation points to the base station, and the signaling indicates a content of: sending the model segmentation points to the receiving side.

Figure 14:
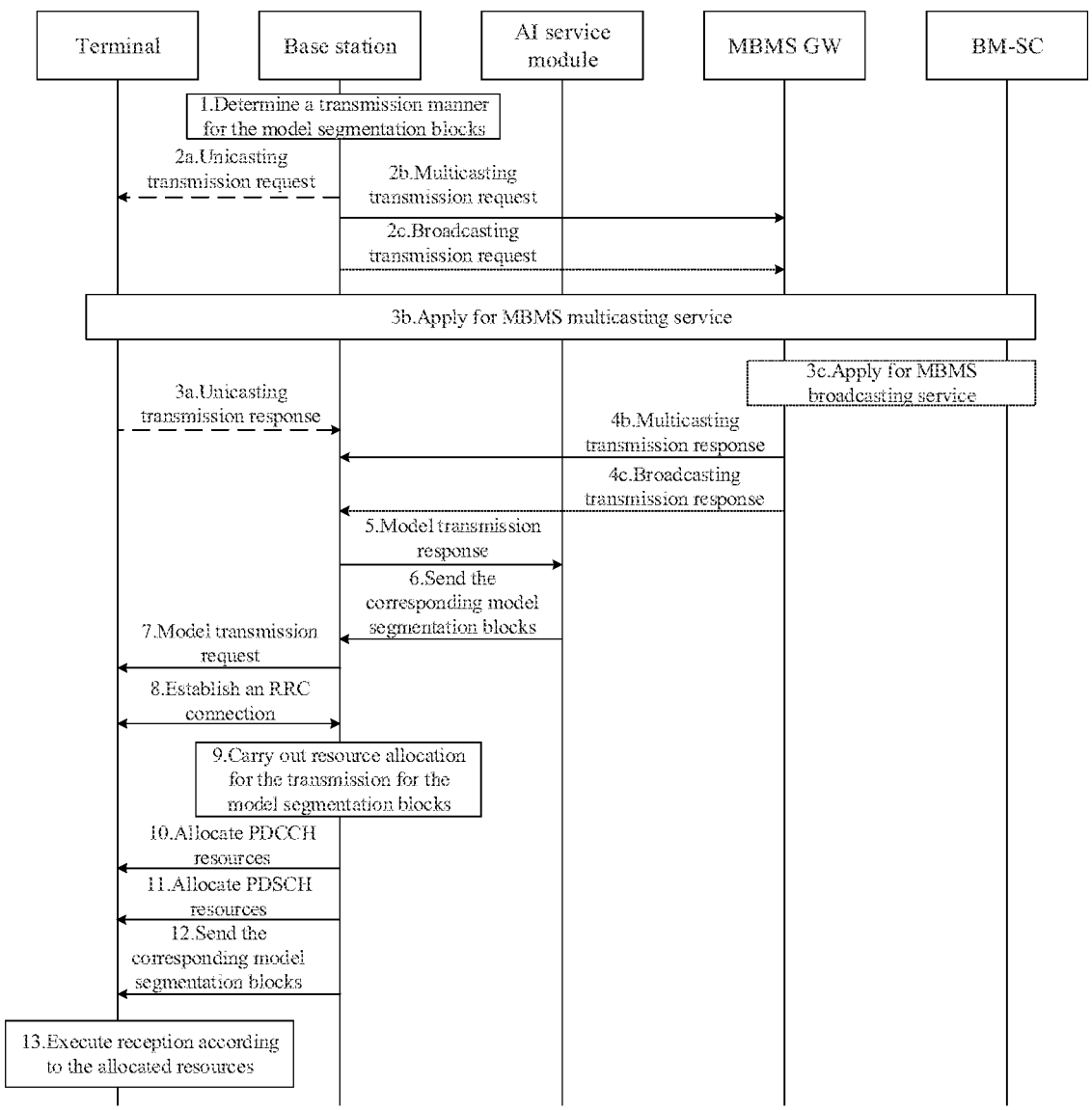
FIG. 14 is a principle diagram of protocols and interfaces of multicasting/broadcasting/unicasting transmission and distribution parts of model segmentation blocks in a model transmission method shown according to an exemplary example.

FIG. 14 is a principle diagram of protocols and interfaces of multicasting/broadcasting/unicasting transmission and distribution parts of model segmentation blocks in a model transmission method shown according to an exemplary example. As shown in FIG. 14, it mainly relates to a terminal, a base station, an AI service module, an MBMS GW, and a BM-SC in the model transmission method provided by the examples of the present disclosure. The MBMS GW provides interfaces for entities using MBMS bearing; and the BM-SC provides the functions of configuration and delivery for MBMS user services. The implementation is as follows:

the base station determines transmission manners for the model segmentation blocks according to model segmentation point options of all the terminals. If the transmission manner for the model segmentation blocks is unicasting transmission: the base station sends a unicasting transmission request signaling to the terminal, and the signaling indicates a content of: initiating a unicasting transmission request to the terminal. The terminal sends a unicasting transmission response signaling to the base station, and the signaling indicates a content of: notifying the base station to accept the model segmentation blocks transmitted through unicasting. If the transmission manner for the model segmentation blocks is multicasting transmission: the base station sends a multicasting transmission request signaling to the MBMS GW, and the signaling indicates a content of: initiating a multicasting transmission request to the MBMS GW. An MBMS multicasting transmission service is applied for among the terminal, the base station, the AI service module, the MBMS GW, and the BM-SC. An MBMS authorization process between the BM-SC and the MBMS GW, an MBMS context activation process between the MBMS GW and the terminal, an MBMS registration process between the BM-SC and the MBMS GW, and a process of verifying MBMS bearing capacity of the terminal by the MBMS GW are included. The MBMS GW sends a multicasting transmission response signaling to the base station, and the signaling indicates a content of: notifying the base station to start to transmit the model segmentation blocks through multicasting. If the transmission manner for the model segmentation blocks is broadcasting transmission: the base station sends a broadcasting transmission request signaling to the MBMS GW, and the signaling indicates a content of: initiating a broadcasting transmission request to the MBMS GW. An MBMS broadcasting transmission service is applied for between the MBMS GW and the BM-SC. An MBMS authorization process between the BM-SC and the MBMS GW, and a process of verifying MBMS bearing capacity of the terminal by the MBMS GW are included. The MBMS GW sends a broadcasting transmission response signaling to the base station, and the signaling indicates a content of: notifying the base station to start to transmit the model segmentation blocks through broadcasting. The base station sends a model transmission response signaling to the AI service module, and the signaling indicates a content of: notifying the AI service module to start model transmission. The AI service module sends the corresponding model segmentation blocks to the base station. The base station sends a model transmission request signaling to the terminal, and the signaling indicates a content of: initiating a model transmission request to the terminal. An RRC connection is established between the base station and the terminal. The base station carries out resource allocation for the transmission for the model segmentation blocks. The base station sends a signaling of allocating PDCCH resources to the terminal, and the signaling indicates a content of: allocating the PDCCH resources to the receiving side. The base station sends a signaling of allocating PDSCH resources to the terminal, and the signaling indicates a content of: allocating the PDSCH resources to the receiving side. The base station sends the corresponding model segmentation blocks to the terminal. The terminal executes reception for the model segmentation blocks transmitted through multicasting according to the allocated resources.

Based on the same concept, the examples of the present disclosure further provide a model transmission apparatus.

It may be understood that, in order to realize the above functions, the model transmission apparatus provided by the examples of the present disclosure includes hardware structures and/or software modules corresponding to execution for the functions. In combination with units and algorithmic steps of instances disclosed in the examples of the present disclosure, the examples of the present disclosure can be realized in the form of hardware or a combination of hardware and computer software. Whether a certain function is executed by hardware or in a manner of driving hardware by computer software depends on constraint conditions of specific applications and designs of the technical solution. The persons skilled in the art may use different methods for each specific application to realize the described functions, but such realization should not be considered beyond the scope of the technical solution of the examples of the present disclosure.

Figure 15:
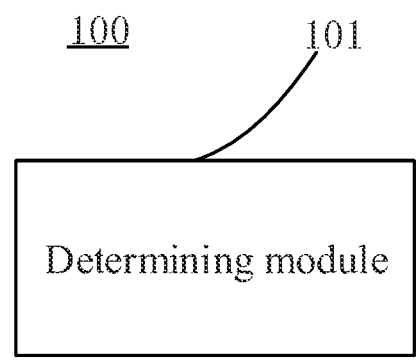
FIG. 15 is a block diagram of a model transmission apparatus shown according to an exemplary example.

FIG. 15 is a block diagram of a model transmission apparatus shown according to an exemplary example. Referring to FIG. 15, the model transmission apparatus 100 is applied to a network device, and includes a determining module 101.

The determining module 101 is configured to, in response to receiving at least one model distribution request, determine a first model, and obtain a first quantity of model segmentation blocks by segmenting the first model. Each model distribution request in the at least one model distribution request corresponds to the model segmentation blocks.

In the examples of the present disclosure, the model distribution request includes first model precision, first model reasoning complexity and a first model data amount.

The determining module 101 is configured to determine second model precision, second model reasoning complexity and a second model data amount of each of a plurality of models. Based on a predefined operation rule, a first operation value of the first model precision and the second model precision, a second operation value of the first model reasoning complexity and the second model reasoning complexity, and a third operation value of the first model data amount and the second model data amount are determined. The model corresponding to the minimum value of the sum of the first operation value, the second operation value and the third operation value is determined as a first model.

In the examples of the present disclosure, the determining module 101 is configured to, in response to that the second model precision is greater than or equal to the first model precision, determine that the first operation value is zero as the operation rule; or, in response to that the second model precision is less than the first model precision, determine that the first operation value is the square of the difference between the first model precision and the second model precision as the operation rule; or, in response to that the first model reasoning complexity is greater than or equal to the second model reasoning complexity, determine that the second operation value is zero as the operation rule; or, in response to that the first model reasoning complexity is less than the second model reasoning complexity, determine that the second operation value is the square of the difference between the first model reasoning complexity and the second model reasoning complexity as the operation rule; or, in response to that the first model data amount is greater than or equal to the second model data amount, determine that the third operation value is zero as the operation rule; or, in response to that the first model data amount is less than the second model data amount, determine that the third operation value is the square of the difference between the first model data amount and the second model data amount as the operation rule.

In the examples of the present disclosure, the model distribution request includes computing power resources and communication resources, and the determining module 101 is further configured to determine a first model data amount of the first model, and determine a plurality of model segmentation point options based on the first model data amount, the computing power resources and the communication resources, where the model segmentation point options are configured to segment the first model.

In the examples of the present disclosure, the apparatus is further configured to:

send a first indication message, where the first indication message includes the plurality of model segmentation point options.

In the examples of the present disclosure, the model distribution request includes first model segmentation point options.

The determining module 101 is configured to determine at least one first model segmentation point option.

In the examples of the present disclosure, the determining module is further configured to determine a combination threshold value of the model segmentation blocks, and determine a difference value between each two model segmentation blocks in the first quantity of model segmentation blocks. In response to that a first difference value in the difference values is less than or equal to the combination threshold value, the two model segmentation blocks corresponding to the first difference value are determined to be the same, and the model segmentation blocks are combined to obtain a second quantity of model segmentation blocks.

In the examples of the present disclosure, the determining module 101 is configured to determine first model reasoning complexity, and determine channel quality. The combination threshold value is determined to be proportional to the reciprocal of the product of the first model reasoning complexity and the channel quality.

In the examples of the present disclosure, the determining module 101 is configured to determine a matrix of the first quantity of model segmentation blocks, and determine the difference value between each two model segmentation blocks based on the matrix.

In the examples of the present disclosure, the apparatus is further configured to:

send a second indication message, where the second indication message includes at least one model segmentation block in the second quantity of model segmentation blocks.

In the examples of the present disclosure, the determining module 101 is configured to, in response to that the first model segmentation blocks in the second quantity of model segmentation blocks correspond to one model distribution request, determine to send the second indication message based on unicasting; or, in response to that the first model segmentation blocks in the second quantity of model segmentation blocks correspond to a plurality of the model distribution requests, determine to send the second indication message based on multicasting; or, in response to that the first model segmentation blocks in the second quantity of model segmentation blocks correspond to all the model distribution requests, determine to send the second indication message based on broadcasting.

Figure 16:
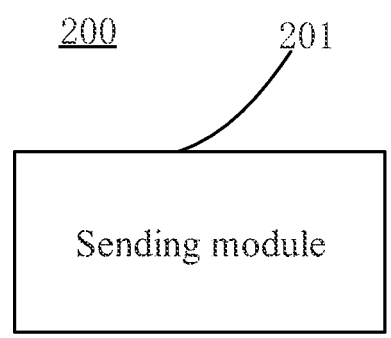
FIG. 16 is a block diagram of another model transmission apparatus shown according to an exemplary example.

FIG. 16 is a block diagram of a model transmission apparatus shown according to an exemplary example. Referring to FIG. 6, the model transmission apparatus 200 is applied to a terminal, and includes a sending module 201.

The sending module 201 is configured to send a model distribution request. The model distribution request corresponds to model segmentation blocks.

In the examples of the present disclosure, the apparatus is further configured to:
receive a first indication message, where the first indication message includes a plurality of model segmentation point options, and the model segmentation point options are configured to segment a model. First model segmentation point options are determined based on the first indication message.

In the examples of the present disclosure, the apparatus is further configured to:
determine a third quantity of model segmentation point options in the plurality of model segmentation point options according to own needs of the terminal. First model reasoning complexity and a first model data amount are determined, and third model reasoning complexity and a third model data amount of a model segmentation block corresponding to each model segmentation point option of the third quantity of model segmentation point options are determined. Based on a predefined operation rule, a fourth operation value of the first model reasoning complexity and the third model reasoning complexity, and a fifth operation value of the first model data amount and the third model data amount are determined. The model segmentation point options corresponding to the minimum value of the sum of the fourth operation value and the fifth operation value are determined as model segmentation point options.

In the examples of the present disclosure, the predefined operation rule includes:
in response to that the first model reasoning complexity is greater than or equal to the third model reasoning complexity, determining that the fourth operation value is zero as the operation rule; or, in response to that the first model reasoning complexity is less than the third model reasoning complexity, determining that the fourth operation value is the square of the difference between the first model reasoning complexity and the third model reasoning complexity as the operation rule; or, in response to that the first model data amount is greater than or equal to the third model data amount, determining that the fifth operation value is zero as the operation rule; or, in response to that the first model data amount is less than the third model data amount, determining that the fifth operation value is the square of the difference between the first model data amount and the third model data amount as the operation rule.

In the examples of the present disclosure, the apparatus is further configured to:
receive a second indication message, where the second indication message includes at least one model segmentation block in the second quantity of model segmentation blocks.

With regard to the apparatus in the above examples, the specific manners in which various modules execute operations are already described in detail in the examples related to the method, and will not be explained in detail here.

Figure 17:
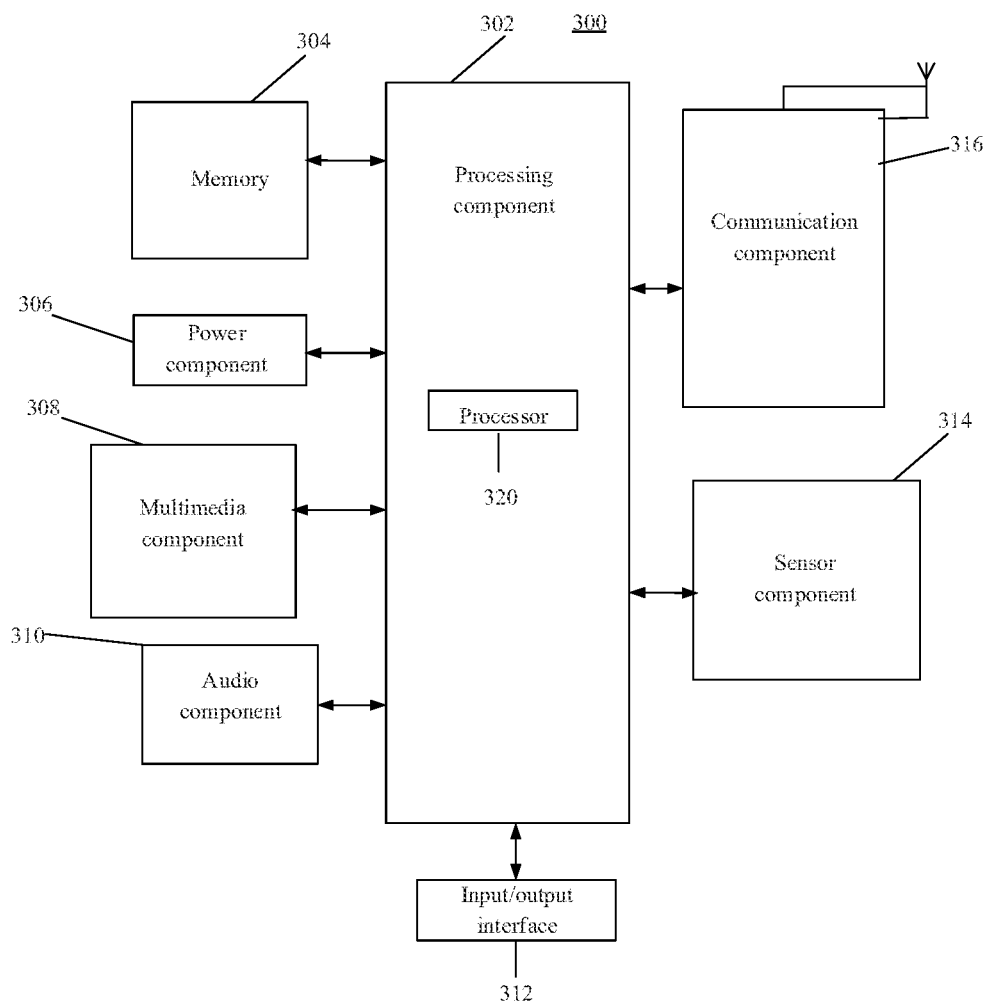
FIG. 17 is a block diagram of an apparatus used for model transmission, which is shown according to an exemplary example.

FIG. 17 is a block diagram of an apparatus 300 for model transmission, which is shown according to an exemplary example. For example, the apparatus 300 may be a mobile phone, a computer, a digital broadcasting terminal, a messaging device, a game console, a tablet device, a medical device, a fitness device, a personal digital assistant, etc.

Referring to FIG. 3, the apparatus 300 may include one or more of the following components: a processing component 302, a memory 304, a power component 306, a multimedia component 308, an audio component 310, an input/output (I/O) interface 312, a sensor component 314, and a communication component 316.

The processing component 302 usually controls the overall operations of the apparatus 300, such as operations associated with display, telephone calling, data communication, camera operations and recording operations. The processing component 302 may include one or more processors 320 to execute instructions to complete all of or part of the steps of the above method. In addition, the processing component 302 may include one or more modules to facilitate interaction between the processing component 302 and the other components. For example, the processing component 302 may include a multimedia module to facilitate interaction between the multimedia component 308 and the processing component 302.

The memory 304 is configured to store various types of data to support the operations in the apparatus 300. Instances of the data include instructions for any application program or method operated in the apparatus 300, contact data, phone book data, messages, pictures, videos, etc. The memory 304 may be realized by any type of volatile storage device or non-volatile storage device or a combination thereof, such as a static random access memory (SRAM), an electrically-erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 306 provides power to the various components of the apparatus 300. The power component 306 may include a power management system, one or more power suppliers, and other components associated with power generation, management and distribution for the apparatus 300.

The multimedia component 308 includes a screen for providing an output interface between the apparatus 300 and a user. In some examples, the screen may include a liquid crystal display (LCD) and a touch panel (TP). If the screen includes a touch panel, the screen may be realized as a touch screen to receive input signals from the user. The touch panel includes one or more touch sensors to sense touch, sliding and gestures on the touch panel. The touch sensor may not only sense a boundary of the touch action or the sliding action, but also detect a duration and a pressure which are related to the touch operation or the sliding operation. In some embodiments, the multimedia component 308 includes a front camera and/or a rear camera. When the apparatus 300 is in an operation mode, such as a shooting mode or a video mode, the front camera and/or the rear camera may receive external multimedia data. Each front camera or each rear camera may be a fixed optical lens system or may have a focal length and optical zoom capability.

The audio component 310 is configured to output and/or input audio signals. For example, the audio component 310 includes a microphone (MIC), and when the apparatus 300 is in an operation mode, such as a calling mode, a recording mode, and a voice recognition mode, the microphone is configured to receive external audio signals. The received audio signals may be further stored in the memory 304 or sent by the communication component 316. In some examples, the audio component 310 further includes a loudspeaker for outputting the audio signals.

The I/O interface 312 provides an interface between the processing component 302 and peripheral interface modules, and the peripheral interface modules may be a keyboard, a click wheel, buttons, etc. The buttons may include, but are not limited to: a home button, a volume button, a start button, and a locking button.

The sensor component 314 includes one or more sensors for providing state evaluation in various aspects for the apparatus 300. For example, the sensor component 314 may detect an on/off state of the apparatus 300, and relative locations of the components such as a display and a keypad of the apparatus 300, the sensor component 314 may further detect a position change of the apparatus 300 or one component of the apparatus 300, existence or non-existence of contact between the user and the apparatus 300, an orientation or acceleration/deceleration of the apparatus 300, and a temperature change of the apparatus 300. The sensor component 314 may include a proximity sensor which is configured to detect presence of nearby objects without any physical contact. The sensor component 314 may further include an optical sensor such as a CMOS or CCD image sensor, which is used in imaging applications. In some examples, the sensor component 314 may further include an acceleration sensor, a gyroscope sensor, a magnetic sensor, a pressure sensor or a temperature sensor.

The communication component 316 is configured to facilitate communication in a wired manner or a wireless manner between the apparatus 300 and other devices. The apparatus 300 may be accessed into a wireless network based on communication standards, such as WiFi, 2G or 3G, or a combination thereof. In an exemplary example, the communication component 316 receives broadcasting signals or broadcasting-related information from an external broadcasting management system via a broadcasting channel. In an exemplary example, the communication component 316 further includes a near-field communication (NFC) module to facilitate short-range communication. For example, the NFC module may be realized based on a radio frequency identification (RFID) technology, an infrared data association (IrDA) technology, an ultra-wideband (UWB) technology, a Bluetooth (BT) technology, and other technologies.

In the exemplary examples, the apparatus 300 may be realized by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components, and is configured to execute the above method.

In the exemplary examples, a non-transitory computer-readable storage medium including instructions is further provided, such as a memory 304 including instructions, and the instructions may be executed by the processor 320 of the apparatus 300 to complete the above method. For example, the non-transitory computer-readable storage medium may be an ROM, a random access memory (RAM), a CD-ROM, a magnetic tape, a floppy disk, an optical data storage device, etc.

Figure 18:
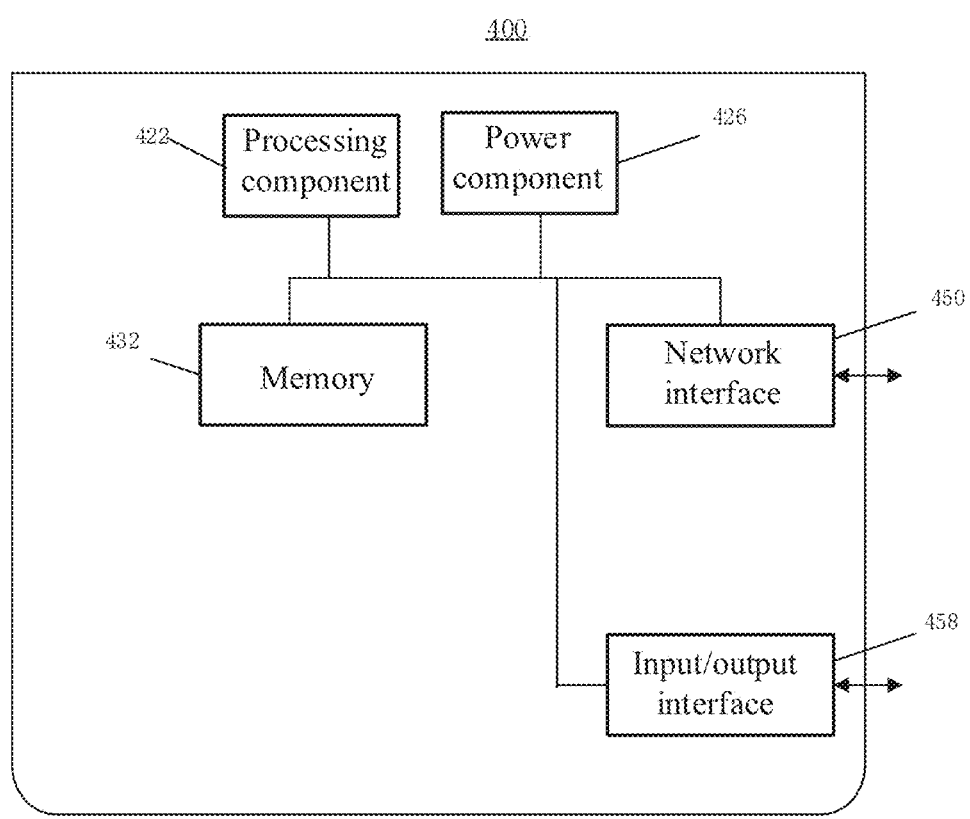
FIG. 18 is a block diagram of another apparatus used for model transmission, which is shown according to an exemplary example.

FIG. 18 is a block diagram of an apparatus 400 for model transmission, which is shown according to an exemplary example. For example, the apparatus 400 may be provided as a server. Referring to FIG. 18, the apparatus 400 includes a processing component 422, and further includes one or more processors, and memory resources represented by the memory 432 and configured to store instructions capable of being executed by the processing component 422, such as application programs. The application programs stored in the memory 432 may include one or more modules corresponding to a set of instructions respectively. In addition, the processing component 422 is configured to execute the instructions to execute the above method.

The apparatus 400 may further include a power component 426 configured to execute power management on the apparatus 400, a wired or wireless network interface 450 configured to connect the apparatus 400 to a network, and an input/output (I/O) interface 458. The apparatus 400 may operate an operating system stored in the memory 432, such as Windows Server™, Mac OS X™, Unix™, Linux™, FreeBSD™, or similar.

It may further be understood that, 'multiple' in the present disclosure refers to two or more than two, and other quantifiers are similar to it. 'And/or', which describes association relationships of associated objects, indicates that there may be three relationships, such as A and/or B, which may indicate: the three cases of the existence of A alone, the existence of A and B simultaneously, and the existence of B alone. The character '/' generally indicates that the former and later associated objects are in an 'or' relationship. The singular forms of 'a', 'said', and 'the' are also intended to include the majority forms, unless the context clearly indicates other meanings.

It may further be understood that, the terms 'first', 'second', etc. are used for describing various information, but such information should not be limited to the terms. Such terms are merely used for distinguishing the same type of information from each other and do not indicate a specific order or degree of importance. In fact, the expressions such as 'first' and 'second' may be absolutely used interchangeably. For example, without departing from the scope of the present disclosure, the first information may also be referred to as the second information, and similarly, the second information may also be referred to as the first information.

It may further be understood that, in the examples of the present disclosure, although the operations are described in a particular order in the drawings, it should not be understood as requiring that the operations are executed in the particular order shown or in a serial order, or requiring that all the operations shown are executed to obtain desired results. In a specific environment, multitasking and parallel processing may be advantageous.

The persons skilled in the art would readily conceive of other implementation solutions of the present disclosure after considering the specification and practicing the invention disclosed here. The present application is intended to cover any variations, uses or adaptive changes of the present disclosure, and these variations, uses or adaptive changes follow the general principles of the present disclosure and include common general knowledge or conventional technical means that are not disclosed by the present disclosure, in the technical field. The specification and the examples are merely considered as exemplary, and the true scope and spirit of the present disclosure are indicated by the following claims.

It needs to be understood that, the present disclosure is not limited to the precise structure described above and shown in the drawings, and various modifications and changes may be made without departing from the scope. The scope of the present disclosure is only limited by the accompanying claims.

According to a first aspect of the examples of the present disclosure, a model transmission method is provided, and performed by a network device, and the method includes:
    in response to receiving at least one model distribution request, determining a first model, and obtaining a first quantity of model segmentation blocks by segmenting the first model; where each model distribution request in the at least one model distribution request corresponds to the model segmentation blocks.

In one example, the model distribution request includes first model precision, first model reasoning complexity and a first model data amount; and
    in response to receiving the at least one model request, determining the first model includes:
    determining second model precision, second model reasoning complexity and a second model data amount of each of a plurality of models; based on a predefined operation rule, determining a first operation value of the first model precision and the second model precision, a second operation value of the first model reasoning complexity and the second model reasoning complexity, and a third operation value of the first model data amount and the second model data amount; and determining the model corresponding to the minimum value of the sum of the first operation value, the second operation value and the third operation value as a first model.

In one example, the predefined operation rule is determined in the following manner:
    in response to that the second model precision is greater than or equal to the first model precision, determining that the first operation value is zero as the operation rule;
or
    in response to that the second model precision is less than the first model precision, determining that the first operation value is the square of the difference between the first model precision and the second model precision as the operation rule;
or
    in response to that the first model reasoning complexity is greater than or equal to the second model reasoning complexity, determining that the second operation value is zero as the operation rule;
or
    in response to that the first model reasoning complexity is less than the second model reasoning complexity, determining that the second operation value is the square of the difference between the first model reasoning complexity and the second model reasoning complexity as the operation rule;
or
    in response to that the first model data amount is greater than or equal to the second model data amount, determining that the third operation value is zero as the operation rule;
or
    in response to that the first model data amount is less than the second model data amount, determining that the third operation value is the square of the difference between the first model data amount and the second model data amount as the operation rule.

In one example, the model distribution request includes computing power resources and communication resources, and the method further includes:
    determining a first model data amount of the first model, and determining a plurality of model segmentation point options based on the first model data amount, the computing power resources and the communication resources, where the model segmentation point options are configured to segment the first model.

In one example, the method further includes:
    sending a first indication message, where the first indication message includes the plurality of model segmentation point options.

In one example, the model distribution request includes first model segmentation point options; and
    segmenting the first model includes:
    determining at least one first model segmentation point option.

In one example, the method further includes:
    determining a combination threshold value of the model segmentation blocks, and determining a difference value between each two model segmentation blocks in the first quantity of model segmentation blocks; and in response to that a first difference value in the difference values is less than or equal to the combination threshold value, determining the two model segmentation blocks corresponding to the first difference value to be the same, and obtaining a second quantity of model segmentation blocks by combining the model segmentation blocks.

In one example, determining the combination threshold value of the model segmentation blocks includes:
    determining first model reasoning complexity, and determining channel quality; and
    determining the combination threshold value to be proportional to the reciprocal of the product of the first model reasoning complexity and the channel quality.

In one example, determining the difference value between each two model segmentation blocks in the first quantity of model segmentation blocks includes:
    determining a matrix of the first quantity of model segmentation blocks, and determining the difference value between each two model segmentation blocks based on the matrix.

In one example, the method further includes:
    sending a second indication message, where the second indication message includes at least one model segmentation block in the second quantity of model segmentation blocks.

In one example, sending the second indication message includes:
    in response to that the first model segmentation blocks in the second quantity of model segmentation blocks correspond to one model distribution request, determining to send the second indication message based on unicasting;

or in response to that the first model segmentation blocks in the second quantity of model segmentation blocks correspond to a plurality of the model distribution requests, determining to send the second indication message based on multicasting;

or in response to that the first model segmentation blocks in the second quantity of model segmentation blocks correspond to all the model distribution requests, determining to send the second indication message based on broadcasting.

According to a second aspect of the examples of the present disclosure, a model transmission method is provided, and performed by a terminal, and the method includes:

sending a model distribution request; where the model distribution request corresponds to model segmentation blocks.

In one example, the method further includes:

receiving a first indication message, where the first indication message includes a plurality of model segmentation point options, and the model segmentation point options are configured to segment a model; and determining first model segmentation point options based on the first indication message.

In one example, determining the first model segmentation point options based on the first indication message includes:

determining a third quantity of model segmentation point options in the plurality of model segmentation point options according to own needs of the terminal; determining first model reasoning complexity and a first model data amount, and determining third model reasoning complexity and a third model data amount of a model segmentation block corresponding to each model segmentation point option of the third quantity of model segmentation point options; based on a predefined operation rule, determining a fourth operation value of the first model reasoning complexity and the third model reasoning complexity, and a fifth operation value of the first model data amount and the third model data amount; and determining the model segmentation point options corresponding to the minimum value of the sum of the fourth operation value and the fifth operation value as model segmentation point options.

In one example, the predefined operation rule includes:

in response to that the first model reasoning complexity is greater than or equal to the third model reasoning complexity, determining that the fourth operation value is zero as the operation rule;

or in response to that the first model reasoning complexity is less than the third model reasoning complexity, determining that the fourth operation value is the square of the difference between the first model reasoning complexity and the third model reasoning complexity as the operation rule;

or in response to that the first model data amount is greater than or equal to the third model data amount, determining that the fifth operation value is zero as the operation rule;

or in response to that the first model data amount is less than the third model data amount, determining that the fifth operation value is the square of the difference between the first model data amount and the third model data amount as the operation rule.

In one example, the method further includes:

receiving a second indication message, where the second indication message includes at least one model segmentation block in the second quantity of model segmentation blocks.

According to a third aspect of the examples of the present disclosure, a model transmission apparatus is provided, and performed by a network device, and the apparatus includes:

a determining module configured to, in response to receiving at least one model distribution request, determine a first model, and obtain a first quantity of model segmentation blocks by segmenting the first model; where each model distribution request in the at least one model distribution request corresponds to the model segmentation blocks.

In one example, the model distribution request includes first model precision, first model reasoning complexity and a first model data amount; and the determining module is configured to:

determine second model precision, second model reasoning complexity and a second model data amount of each of a plurality of models; based on a predefined operation rule, determine a first operation value of the first model precision and the second model precision, a second operation value of the first model reasoning complexity and the second model reasoning complexity, and a third operation value of the first model data amount and the second model data amount; and determine the model corresponding to the minimum value of the sum of the first operation value, the second operation value and the third operation value as a first model.

In one example, the determining module is configured to:

in response to that the second model precision is greater than or equal to the first model precision, determine that the first operation value is zero as the operation rule;

or in response to that the second model precision is less than the first model precision, determine that the first operation value is the square of the difference between the first model precision and the second model precision as the operation rule;

or in response to that the first model reasoning complexity is greater than or equal to the second model reasoning complexity, determine that the second operation value is zero as the operation rule;

or in response to that the first model reasoning complexity is less than the second model reasoning complexity, determine that the second operation value is the square of the difference between the first model reasoning complexity and the second model reasoning complexity as the operation rule;

or in response to that the first model data amount is greater than or equal to the second model data amount, determine that the third operation value is zero as the operation rule;

or in response to that the first model data amount is less than the second model data amount, determine that the third operation value is the square of the difference between the first model data amount and the second model data amount as the operation rule.

In one example, the model distribution request includes computing power resources and communication resources, and the determining module is further configured to:

determine a first model data amount of the first model, and determine a plurality of model segmentation point options based on the first model data amount, the computing power resources and the communication resources, where the model segmentation point options are configured to segment the first model.

In one example, the apparatus is further configured to:

send a first indication message, where the first indication message includes the plurality of model segmentation point options.

In one example, the model distribution request includes first model segmentation point options; and the determining module is configured to:

determine at least one first model segmentation point option.

In one example, the determining module is further configured to:

determine a combination threshold value of the model segmentation blocks, and determine a difference value between each two model segmentation blocks in the first quantity of model segmentation blocks; and in response to that a first difference value in the difference values is less than or equal to the combination threshold value, determine the two model segmentation blocks corresponding to the first difference value to be the same, and obtain a second quantity of model segmentation blocks by combining the model segmentation blocks.

In one example, the determining module is configured to:

determine first model reasoning complexity, and determine channel quality; and determine the combination threshold value to be proportional to the reciprocal of the product of the first model reasoning complexity and the channel quality.

In one example, the determining module is configured to:

determine a matrix of the first quantity of model segmentation blocks, and determine the difference value between each two model segmentation blocks based on the matrix.

In one example, the apparatus is further configured to:

send a second indication message, where the second indication message includes at least one model segmentation block in the second quantity of model segmentation blocks.

In one example, the determining module is configured to:

in response to that the first model segmentation blocks in the second quantity of model segmentation blocks correspond to one model distribution request, determine to send the second indication message based on unicasting;

or in response to that the first model segmentation blocks in the second quantity of model segmentation blocks correspond to a plurality of the model distribution requests, determine to send the second indication message based on multicasting;

or in response to that the first model segmentation blocks in the second quantity of model segmentation blocks correspond to all the model distribution requests, determine to send the second indication message based on broadcasting.

According to a fourth aspect of the examples of the present disclosure, a model transmission apparatus is provided, and performed by a terminal, and the apparatus includes:

a sending module configured to send a model distribution request; where the model distribution request corresponds to model segmentation blocks.

In one example, the apparatus is further configured to:

receive a first indication message, where the first indication message includes a plurality of model segmentation point options, and the model segmentation point options are configured to segment a model; and determine first model segmentation point options based on the first indication message.

In one example, the apparatus is further configured to:

determine a third quantity of model segmentation point options in the plurality of model segmentation point options according to own needs of the terminal; determine first model reasoning complexity and a first model data amount, and determine third model reasoning complexity and a third model data amount of a model segmentation block corresponding to each model segmentation point option of the third quantity of model segmentation point options; based on a predefined operation rule, determine a fourth operation value of the first model reasoning complexity and the third model reasoning complexity, and a fifth operation value of the first model data amount and the third model data amount; and determine the model segmentation point options corresponding to the minimum value of the sum of the fourth operation value and the fifth operation value as model segmentation point options.

In one example, the predefined operation rule includes:

in response to that the first model reasoning complexity is greater than or equal to the third model reasoning complexity, determining that the fourth operation value is zero as the operation rule;

or in response to that the first model reasoning complexity is less than the third model reasoning complexity, determining that the fourth operation value is the square of the difference between the first model reasoning complexity and the third model reasoning complexity as the operation rule;

or in response to that the first model data amount is greater than or equal to the third model data amount, determining that the fifth operation value is zero as the operation rule;

or in response to that the first model data amount is less than the third model data amount, determining that the fifth operation value is the square of the difference between the first model data amount and the third model data amount as the operation rule.

In one example, the apparatus is further configured to:

receive a second indication message, where the second indication message includes at least one model segmentation block in the second quantity of model segmentation blocks.

According to a fifth aspect of the examples of the present disclosure, a model transmission apparatus is provided, and includes:

a processor; and a memory configured to store instructions capable of being executed by the processor; where the processor is configured to: execute the model transmission method in the first aspect or in any one example in the first aspect, or execute the model transmission method in the second aspect or in any one example in the second aspect.

According to a sixth aspect of the examples of the present disclosure, a non-transitory computer-readable storage medium is provided, and when instructions in the storage medium are executed by a processor of a mobile terminal, the mobile terminal is enabled to execute the model transmission method in the first aspect or in any one example in the first aspect, or the mobile terminal is enabled to execute the model transmission method in the second aspect or in any one example in the second aspect.

The technical solution provided by the examples of the present disclosure may include the following beneficial effects: through receiving the model distribution request, determining the first model in the plurality of models, and segmenting the first model, the selected model may achieve relatively high model precision and relatively low model complexity in all the terminals, and communication overheads may be reduced in subsequent transmission through model segmentation.

The invention claimed is:

1. A model transmission method, comprising:
in response to receiving at least one model distribution request, determining a first model and obtaining a first quantity of model segmentation blocks by segmenting the first model, wherein each model distribution request in the at least one model distribution request corresponds to the model segmentation blocks;
wherein the at least one model distribution request comprises a first model precision, a first model reasoning complexity and a first model data amount; and
in response to receiving the at least one model distribution request, determining the first model comprises:
determining a second model precision, a second model reasoning complexity and a second model data amount of each of a plurality of models;
determining a first operation value of the first model precision and the second model precision, a second operation value of the first model reasoning complexity and the second model reasoning complexity, and a third operation value of the first model data amount and the second model data amount based on a predefined operation rule; and
determining a model corresponding to a minimum value of a sum of the first operation value, the second operation value and the third operation value as the first model.

2. The model transmission method according to claim 1, wherein the predefined operation rule is determined by:
in response to the second model precision being greater than or equal to the first model precision, determining that the first operation value is zero as the predefined operation rule; or
in response to the second model precision being less than the first model precision, determining that the first operation value is the square of a difference between the first model precision and the second model precision as the predefined operation rule; or
in response to the first model reasoning complexity being greater than or equal to the second model reasoning complexity, determining that the second operation value is zero as the predefined operation rule; or
in response to the first model reasoning complexity being less than the second model reasoning complexity, determining that the second operation value is the square of a difference between the first model reasoning complexity and the second model reasoning complexity as the predefined operation rule; or
in response to the first model data amount being greater than or equal to the second model data amount, determining that the third operation value is zero as the predefined operation rule; or
in response to the first model data amount being less than the second model data amount, determining that the third operation value is the square of a difference between the first model data amount and the second model data amount as the predefined operation rule.

3. The model transmission method according to claim 1, wherein the at least one model distribution request comprises computing power resources and communication resources, and the model transmission method further comprises:
determining a first model data amount of the first model, and determining a plurality of model segmentation point options based on the first model data amount, the computing power resources and the communication resources, wherein the plurality of model segmentation point options is configured to segment the first model.

4. The model transmission method according to claim 3, further comprising: sending a first indication message, wherein the first indication message comprises the plurality of model segmentation point options.

5. The model transmission method according to claim 1, wherein the at least one model distribution request comprises first model segmentation point options; and segmenting the first model comprises: determining at least one first model segmentation point option.

6. The model transmission method according to claim 1, further comprising:
determining a combination threshold value of the model segmentation blocks, and determining a difference value between each of two model segmentation blocks in the first quantity of model segmentation blocks; and
in response to a first difference value in the difference values being less than or equal to the combination threshold value, determining the two model segmentation blocks corresponding to the first difference value to be the same, and obtaining a second quantity of model segmentation blocks by combining the two model segmentation blocks.

7. The model transmission method according to claim 6, wherein determining the combination threshold value of the model segmentation blocks comprises:
determining a first model reasoning complexity, and determining a channel quality; and
determining the combination threshold value to be proportional to a reciprocal of the product of the first model reasoning complexity and the channel quality.

8. The model transmission method according to claim 6, wherein determining the difference value between each of two model segmentation blocks in the first quantity of model segmentation blocks comprises:
determining a matrix of the first quantity of model segmentation blocks, and determining the difference value between each of two model segmentation blocks based on the matrix.

9. The model transmission method according to claim 6, further comprising:
sending a second indication message, wherein the second indication message comprises at least one model segmentation block in the second quantity of model segmentation blocks.

10. The model transmission method according to claim 9, wherein sending the second indication message comprises:
- in response to the first model segmentation blocks in the second quantity of model segmentation blocks corresponding to one model distribution request, determining to send the second indication message based on unicasting; or
- in response to the first model segmentation blocks in the second quantity of model segmentation blocks corresponding to a plurality of the model distribution requests, determining to send the second indication message based on multicasting; or
- in response to the first model segmentation blocks in the second quantity of model segmentation blocks corresponding to all the model distribution requests, determining to send the second indication message based on broadcasting.

11. A model transmission method, comprising:
- sending a model distribution request, wherein the model distribution request corresponds to model segmentation blocks;
- receiving a first indication message, wherein the first indication message comprises a plurality of model segmentation point options, and wherein the plurality of model segmentation point options is configured to segment a model; and
- determining first model segmentation point options based on the first indication message;
- wherein determining the first model segmentation point options based on the first indication message comprises:
  - determining a third quantity of model segmentation point options in the plurality of model segmentation point options according to own needs of a terminal;
  - determining first model reasoning complexity and a first model data amount, and determining third model reasoning complexity and a third model data amount of a model segmentation block corresponding to each model segmentation point option of the third quantity of model segmentation point options;
  - determining a fourth operation value of the first model reasoning complexity and the third model reasoning complexity, and a fifth operation value of the first model data amount and the third model data amount based on a predefined operation rule; and determining the model segmentation point options corresponding to a minimum value of a sum of the fourth operation value and the fifth operation value as first model segmentation point options.

12. The model transmission method according to claim 11, wherein the predefined operation rule comprises is determined by:
- in response to the first model reasoning complexity being greater than or equal to the third model reasoning complexity, determining that the fourth operation value is zero as the predefined operation rule; or
- in response to the first model reasoning complexity being less than the third model reasoning complexity, determining that the fourth operation value is the square of a difference between the first model reasoning complexity and the third model reasoning complexity as the predefined operation rule; or
- in response to the first model data amount being greater than or equal to the third model data amount, determining that the fifth operation value is zero as the predefined operation rule; or
- in response to the first model data amount beingless than the third model data amount, determining that the fifth operation value is the square of a difference between the first model data amount and the third model data amount as the predefined operation rule.

13. The model transmission method according to claim 11, further comprising:
- receiving a second indication message, wherein the second indication message comprises at least one model segmentation block in a second quantity model segmentation blocks.

14. A model transmission apparatus, comprising:
- a processor; and
- a memory for storing instructions capable of being executed by the processor, wherein the processor is configured to:
- in response to receiving at least one model distribution request, determine a first model and obtain a first quantity of model segmentation blocks by segmenting the first model, wherein each model distribution request in the at least one model distribution request corresponds to the model segmentation blocks;
- wherein the at least one model distribution request comprises a first model precision, a first model reasoning complexity and a first model data amount; and
- in response to receiving the at least one model distribution request, determining the first model comprises:
  - determining a second model precision, a second model reasoning complexity and a second model data amount of each of a plurality of models;
  - determining a first operation value of the first model precision and the second model precision, a second operation value of the first model reasoning complexity and the second model reasoning complexity, and a third operation value of the first model data amount and the second model data amount based on a predefined operation rule; and
  - determining a model corresponding to a minimum value of a sum of the first operation value, the second operation value and the third operation value as the first model.

* * * * *